(12) United States Patent
Moroni et al.

(10) Patent No.: US 7,859,681 B2
(45) Date of Patent: Dec. 28, 2010

(54) PRESSURE TRANSMITTER FOR DETECTION OF A VARIABLE RELATIVE TO A PROCESS FLUID

(75) Inventors: Andrea Moroni, Gorla Minore (IT); Andrea Pozzi, Villa Guardia (IT)

(73) Assignee: ABB S.p.A., Milan (IT)

( * ) Notice: Subject to any disclaimer, the term of this patent is extended or adjusted under 35 U.S.C. 154(b) by 0 days.

(21) Appl. No.: 12/025,795

(22) Filed: Feb. 5, 2008

(65) Prior Publication Data

US 2008/0186478 A1 Aug. 7, 2008

(30) Foreign Application Priority Data

Feb. 5, 2007 (IT) .......................... MI2007A0191

(51) Int. Cl.
*G01B 9/02* (2006.01)
(52) U.S. Cl. ...................................... 356/482
(58) Field of Classification Search ................... 356/73, 356/482, 480, 498, 506, 35.5
See application file for complete search history.

(56) References Cited

U.S. PATENT DOCUMENTS

| | | | |
|---|---|---|---|
| 3,618,390 A * | 11/1971 | Frick | ............................ 73/718 |
| 4,370,890 A | 2/1983 | Frick | |
| 4,428,239 A | 1/1984 | Johnston | |
| 4,543,831 A * | 10/1985 | Meyer | |
| 5,094,109 A * | 3/1992 | Dean et al. | ..................... 73/718 |
| 5,899,962 A * | 5/1999 | Louwagie et al. | ........... 702/138 |
| 2003/0001082 A1 | 1/2003 | Duncan et al. | |
| 2006/0278005 A1* | 12/2006 | Broden et al. | ................. 73/716 |
| 2008/0159687 A1* | 7/2008 | Donlagic et al. | .............. 385/13 |

FOREIGN PATENT DOCUMENTS

JP 57-187633 11/1982

* cited by examiner

*Primary Examiner*—Tarifur Chowdhury
*Assistant Examiner*—Jonathan M Hansen
(74) *Attorney, Agent, or Firm*—Connolly Bove Lodge & Hutz LLP

(57) ABSTRACT

A pressure transmitter for detection of a physical variable relative to a process fluid, comprising: a first and a second pressure-sensitive membrane suitable for interfacing with said process fluid; a pressure sensor having a supporting body provided with a cavity inside which a third pressure-sensitive membrane is positioned; an analysis and conditioning unit operationally coupled to at least one light source; a first and a second optical fiber having a first end operationally coupled to said power source; said first and second optical fibers transmitting the light signals emitted by said source to said third membrane and the signals reflected by the third membrane to said analysis and conditioning unit which generates signals indicating said physical variable.

10 Claims, 2 Drawing Sheets

PRESSURE TRANSMITTER FOR DETECTION OF A VARIABLE RELATIVE TO A PROCESS FLUID

RELATED APPLICATION

This application claims priority to Italian Application No. MI2007A000191 filed Feb. 5, 2007, disclosure of which is incorporated herein by reference.

FIELD OF THE INVENTION

The present invention relates to a pressure transmitter for the detection of a physical variable relative to a process fluid by means of differential measurement.

BACKGROUND OF THE INVENTION

It is known that in industrial process control systems, specific field devices are widely used to detect/measure one or more physical variables of a process fluid, for example absolute, relative or differential pressure, flow, level and similar.

In one of the most widespread embodiments, said field devices comprise an appropriately configured shell which houses the various detection components, typically including a pressure sensor, hence the name pressure transmitters; the use of a pressure sensor as a transducer element allows the operator to easily obtain from one or more measurements of relative, differential or absolute pressure, measurement values relative to other physical variables of the process fluid controlled, for example level, which would otherwise be difficult to transduce directly. The transmitter shell also contains other components including primary electronic circuits for processing the signals coming from the pressure sensor; secondary electronic circuits for processing the signals coming from the primary electronic circuits which are then used for control of the communication with other transmitters or with control units; displays for in-situ display of the variables detected, terminal blocks for the various connections in addition to electric circuits for powering the components, etc.

To perform the detection and measurement operations required, each pressure transmitter is provided with one or more pressure-sensitive elements which interface with the process and are usually referred to by the term separator units, or separation diaphragms or membranes, or other equivalent terms.

In particular, the differential pressure transmitters are provided with two separator units, each of which comprises an elastic element, typically a flexible metallic membrane fixed on a support, which is usually also metallic; the separator unit is positioned on the instrument so that the membrane has an outer wall exposed to the process fluid and an inner wall hydraulically coupled to the pressure sensor, usually by means of a non-compressible fluid, for example silicone oil, contained in a connection capillary. In this way, the pressure exerted by the fluid on each of the flexible membranes causes the deformation thereof and is transferred by means of the hydraulic coupling fluid to the pressure sensor. In turn the sensor "senses" the pressure on the two branches of the instrument and transmits the corresponding signals to the electronic part for the various processing operations. Sensors currently used for these applications are usually of the capacitive, inductive or even piezoelectric type.

Measurements of this type are usually difficult as the accuracy required is very high vis-à-vis conditions of use that can negatively affect the measurements themselves, for example due to electromagnetic disturbances, changing ambient conditions—such as temperature variations—or intrinsically difficult operating conditions such as potentially explosive environments.

SUMMARY OF THE INVENTION

The main technical aim of the present invention is to realise a pressure transmitter that enables the above-described drawbacks to be overcome.

In particular, the main object of the present invention is to produce a pressure transmitter for the detection of a variable relative to a process fluid that offers high detection precision and accuracy also in particularly difficult environments.

This object can be achieved by a pressure transmitter for the detection of a physical variable relative to a process fluid which comprises:
  a first and a second pressure-sensitive membrane, suitable for interfacing with said process fluid;
  a pressure sensor having a supporting body provided with a cavity inside which a third pressure-sensitive membrane is located, said third membrane having a first face and a second face operationally connected to said first and second membranes respectively, so that the pressure is exerted by the process fluid on said first and second membranes is transmitted to said third membrane, causing a displacement with respect to a reference position;
  an analysis and conditioning unit operationally coupled to at least one light source;
  an optical fibre having a first end operationally connected to said power source and a second end positioned at a pre-set distance from said first face;
  a second optical fibre having a third end operationally connected to said power source and a fourth end positioned at a pre-set distance from said second face; said first and second optical fibres transmitting the light signals emitted by said source to said third membrane and the signals reflected by the third membrane to said analysis and conditioning unit, said analysis and conditioning unit generating, on the basis of the reflected signals received, signals directly or indirectly indicating said physical variable.

For a better understanding of the present invention, reference is mad eto the accompanying drawings and to the detailed description hereinafter, in which preferred but non-limitative embodiments of the transmitter according to the present invention are illustrated.

DESCRIPTION OF THE PREFERRED EMBODIMENTS

In the following description, identical reference numbers will indicate elements that are the same or technically equivalent.

With reference to the figures cited, the pressure transmitter for detection of a physical variable relative to a process fluid according to the present invention comprises a first pressure-sensitive membrane 5A and a second pressure-sensitive membrane 5B suitable for inetrfacing with the process fluid, one or more variables of which, for example the pressure, have to be detected. The two membranes 5A and 5B, usually indicated also as separation diaphragms, or by other equivalent terms, consist, for example, of two corresponding membranes or flexible sheets, e.g. appropriately treated metal sheets which deform elastically under the thrust exerted by the interface fluid. Said membranes 5A and 5B are fixed on a supporting element 6 consisting for example of a hollow metallic block, so that one face is exposed to the action exerted by the process fluid. According to application needs, the two pressure-sensitive elements 5A and 5B can be arranged in different configurations, for example parallel to each other as illustrated in FIG. 1, or on the same plane.

Figure 1:
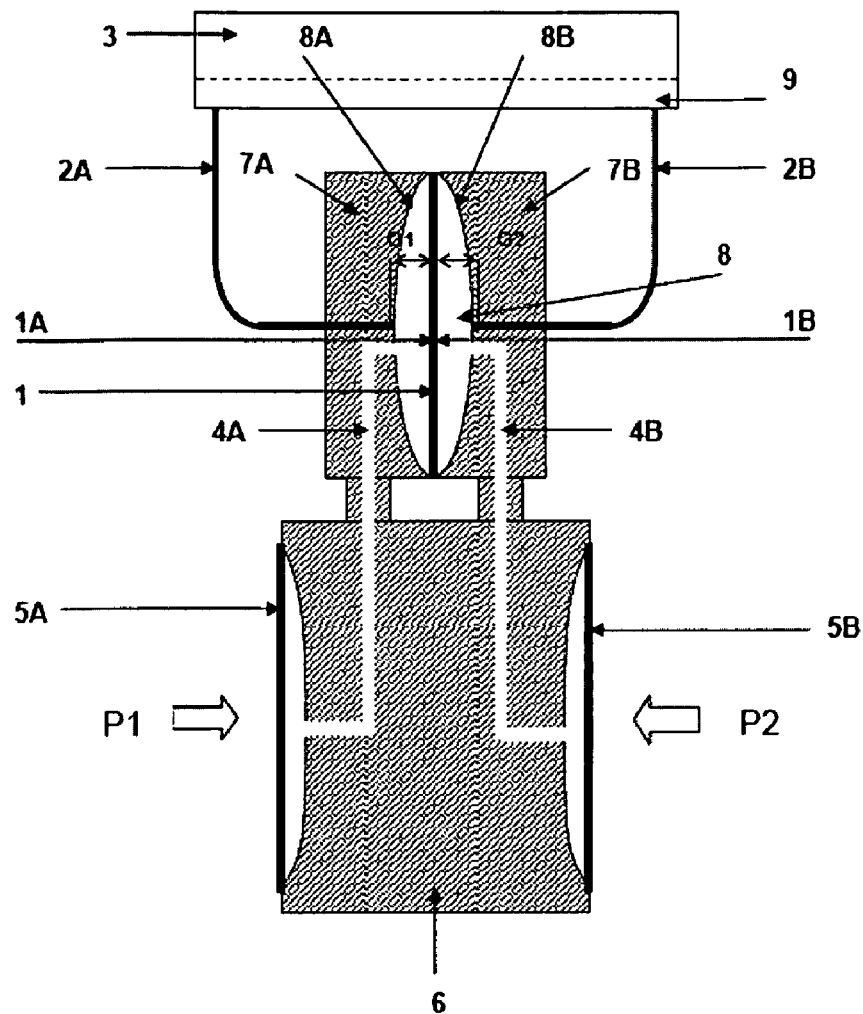
FIG. 1 illustrates schematically some components of the transmitter according to the invention.

The transmitter furthermore comprises a pressure sensor having a supporting body which in the embodiment illustrated in FIG. 1 preferably consists of two half-bodies 7A, 7B coupled to each other and inside which a cavity 8 is defined. The two half-bodies 7A and 7B are mechanically coupled to the supporting element 6 as illustrated in FIG. 1; alternatively it is possible to produce the assembly 7A-7B-6 in one single appropriately configured body, or for example produce only the supportive body of the sensor in one single hollow piece.

Inside the cavity 8 is a third pressure-sensitive membrane 1; analogously to the two pressure-sensitive elements 5A and 5B, also the third membrane 1 consists, for example, of a flexible membrane, such as an appropriately treated metal sheet. The third membrane 1 is fixed inside the cavity 8 and has a first face 1A and a second face 1B operationally connected to the two membranes 5A 5B respectively. In particular, as illustrated in FIG. 1, the two pressure-sensitive elements 5A 5B are connected to the membrane 1 of the sensor by means of a circuit comprising essentially two capillaries 4A, 4B filled with a substantially non-compressible fluid, for example silicone oil. In this way, the two membranes 5A and 5B are hydraulically connected to the membrane 1 so that the pressure exerted by the process fluid on the membranes 5A 5B is transmitted to the third membrane 1 causing a displacement thereof, on one side or the other, with respect to an initial reference position, or equilibrium.

Preferably, the cavity 8 of the supporting body 7A-7B has two shaped surfaces 8A, 8B each of which can geometrically couple respectively with the first face 1A or with the second face 1B of the third membrane 1 when said membrane 1 is subject to a high overpressure on one side with respect to the other.

Advantageously, the transmitter furthermore comprises an analysis and conditioning unit, schematically indicated in FIG. 1 by the reference number 3, which is operationally connected to at least one light source 9, and two optical fibres 2A, 2B. In the embodiment illustrated, the pressure transmitter according to the invention comprises one single light source 9, consisting for example of a diode laser which is included in the analysis and conditioning unit 3. The first optical fibre 2A has a first end operationally connected to the power source 9 and a second end positioned at a pre-set distance G1 from the first face 1A of the membrane 1 when the latter is in the initial reference position. In turn, the second optical fibre 2B has a first end (hereinafter third end) operationally coupled to the power source 9 and a second end (hereinafter fourth end) positioned at a pre-set distance G2 from the second face 1B of the membrane 1 when the latter is in the reference position.

As illustrated schematically in FIG. 1, the analysis and conditioning unit 3, consisting of electronic signal analysis and processing circuits according to embodiments within the capacity of a person skilled in the art and therefore not described in detail, is positioned inside the shell 100 of the transmitter, near the sensor; alternatively, the unit 3 can be positioned remote from and external to the body of the transmitter.

Figure 2:
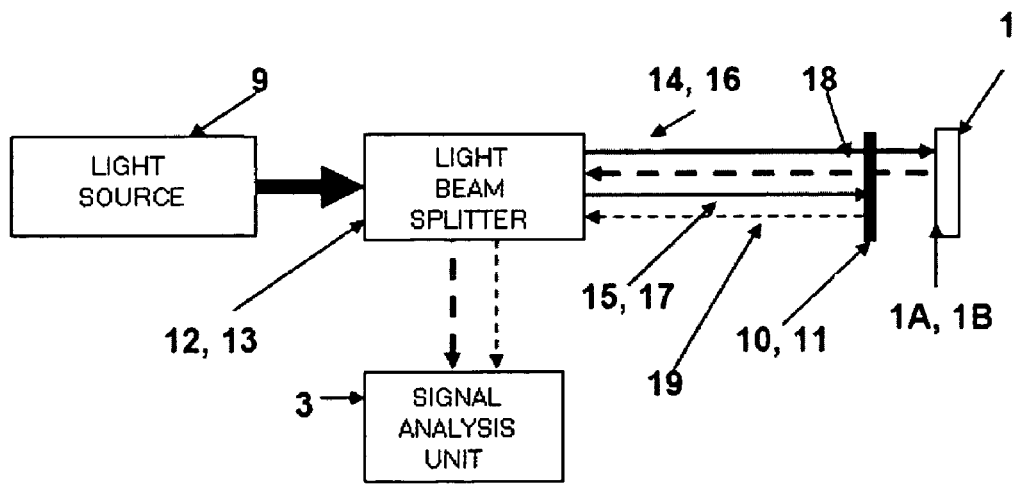
FIG. 2 is a view schematically illustrating the system for detection of the displacement of a side of a measuring membrane belonging to the pressure sensor used in the transmitter according to the invention.

In a particularly preferred embodiment of the transmitter according to the invention, two fixed reference lenses (or surfaces) are used, the first lens 10 being operationally combined with the second end of the first optical fibre 2A, and the second fixed lens 11 being operationally combined with the fourth end of the second optical fibre 2B. According to a possible embodiment, the first fixed lens 10 and the second fixed lens 11 consist of two corresponding reflecting surfaces forming part of the two respective ends of the optical fibres 2A and 2B. Alternatively, said lenses 10 and 11 consist of two corresponding reflecting surfaces separated by the body of the fibres and positioned at a pre-set distance from the respective second and fourth ends of the latter, respectively. As illustrated schematically in FIG. 2, the use of a first beam splitter 12 and a second beam splitter 13 is scheduled between the light source 9 and the two optical fibres 2A and 2B respectively. In FIG. 2, for the sake of simplicity, the components of only one detection branch are shown, the other branch being identical. The first beam splitter is suitable for splitting, within the first optical fibre 2A, the light beams coming from the source into a first optical path 14 which will strike the first face 1A of the third membrane 1 (for example on a suitable area of the latter) and a second optical path 15 which will strike the first fixed lens 10. Analogously, and in the same manner, the second beam splitter 13 is suitable for splitting, within the second optical fibre 2B, the light beams coming from the source 9 into two separate paths, the first of which 16 will strike the second face 1B of the third membrane 1 (for example an appropriate area of the latter) and a second path 17 which will strike the second fixed lens 11. The two beam splitters 12, 13 are furthermore configured so as to direct towards the analysis and conditioning unit the reflected signals 18, 19 coming from the two faces 1A and 1B of the third membrane 1 and from the two fixed lenses 10, 11.

In this way, thanks to the two fixed lenses, a fixed reference distance is defined; the corresponding signals reflected by the two fixed lenses 10,11 allow a reference signal to be generated relative to a known optical path within the transducer.

Figure 3:
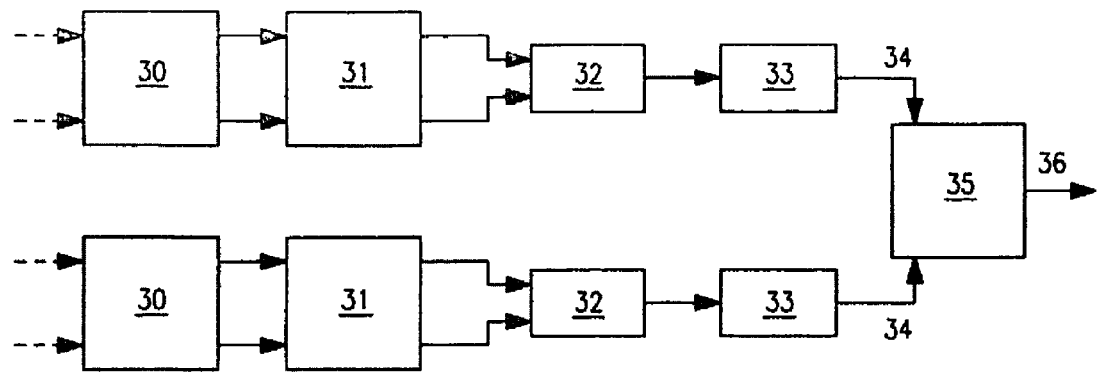
FIG. 3 is a block diagram schematically illustrating an electronic analysis unit used in the transmitter according to the invention.
Figure 4:
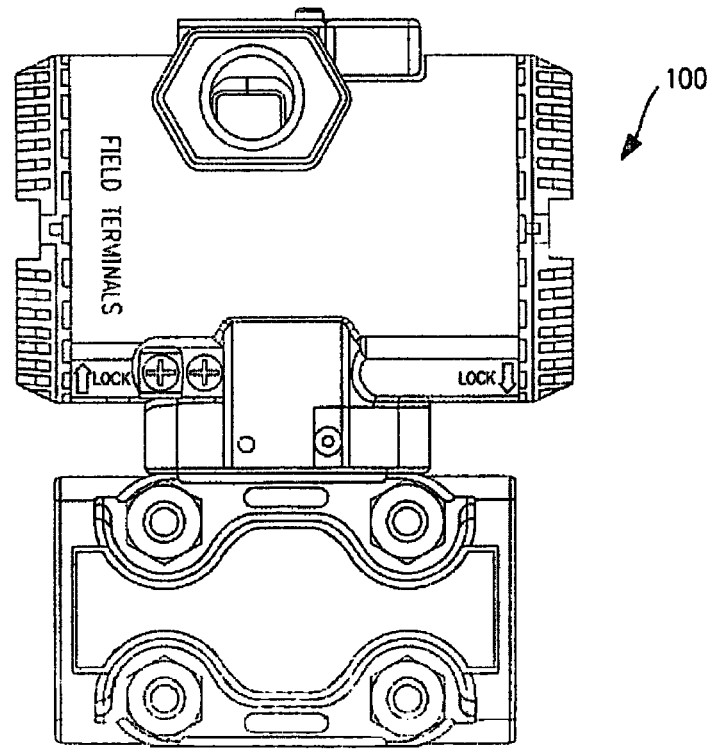
FIG. 4 illustrates a differential pressure transmitter.

In practice when an external pressure P1 is applied to the separation membrane 5A, the pressure spreads through the hydraulic circuit to the membrane 1, causing elastic displacement of the membrane and therefore reducing the distance G2 and increasing the distance G1. Vice versa, when a pressure P2 is applied on the separation membrane 5B, the distance G1 diminishes and the distance G2 increases. If the pressure applied to one of the two sides of the transducer is very high, the geometry of the two half-bodies 7A and 7B is such that the measuring membrane rests perfectly on one of the two surfaces 8A or 8B (the one on the side opposite to which the overpressure is applied). Due to the principle of action-reaction, the membrane 1 is not deformed and strained, hence it will continue to function adequately when the overpressure is removed. The light source 9 powers both of the optical fibres 2A, 2B which transmit the light signal from the source 9 to the measuring membrane 1 and transmit the signal reflected by the measuring membrane 1 to the analysis and conditioning unit 3. By analysing the signals received, the unit 3 allows for measurement of the distance G1, G2 between the measuring membrane and the terminal part of the optical fibres; knowing the initial position of the membrane 1, the differential pressure applied on the transducer can be identified. On the basis of the reflected signals received, the unit 3 can therefore generate signals indicating, directly or indirectly, the physical variable. for example, said signal can be a direct indication of the differential pressure applied on the transmitter or via said differential pressure signal, other variables of interest can be obtained for further processing. In particular, as schematically illustrated in FIG. 3, the analysis and conditioning unit 3 comprises for each optical fibre: a first circuit block 30 for acquisition of the reflected signals received, i.e. the measurement signal reflected by the face 1A or 1B of the membrane 1 and the reference signal reflected by the corresponding fixed lens 10 or 11. A second circuit block 31 performs measurement of the frequency and phase displacement between the signals received, and a third circuit block 32 combines the signals received. Lastly, a fourth circuit block 33 generates a signal 34 indicative of the displacement of the face 1A or 1B. The two signals 34 are then transmitted to a further circuit block 35, one for both branches, which lastly generates a signal 36 indicating the differential pressure detected. As mentioned, said block 35 can be configured so as to obtain from the differential pressure signal the value of other process fluid variables; alternatively the block 35 can transmit said pressure signal to further processing circuits for calculation of the required variables.

In practice the transmitter according to the invention fully achieves the established object since, due to its construction, it permits a significant reduction in common measuring errors. In particular, use of the optical detection system previously described guarantees a high accuracy and resolution, intrisic safety in explosive environments, immunity from radiofrequency disturbances and electromagnetic disturbances. Adoption of the optical reference path parallel to the main measuring path, thanks to the adoption of the fixed lenses 10 11 and the relative optical paths 15, 17, allows for at least partial compensation of possible errors due to variation in the control parameters of the light source, variations in the wavelength of the light signal with temperature, variations in the refraction index of the silicone oil with temperature, micro and nano movements of the mechanical structure (and consequently of the optical measuring path) caused by temperature variations due to the different coefficients of thermal expansion of the materials used. Further advantages are provided by the fact that the sensor is not subject to the temperature of the fluid to the measured since it is appropriately spaced from it and therefore it is possible to measure pressure values of process fluids at temperatures higher than those acceptable to the optical fibre or other elements in the sensor itself. Furthermore, the geometrical form of the two halfbodies 7A and 7B of the sensor body provides intrinsic protection against overpressure. Thanks to the separation membranes and the relative hydraulic circuit, the transducer can be positioned in highly corrosive environments or in contact with abrasive process fluids.

The transmitter thus conceived is subject to numerous modifications and variations all falling within the scope of the inventive concept, provided that they are compatible with the functions for which they are intended; for example, the analysis and conditioning unit could be split into several separate parts communicating—in local or remote mode—with one another and with the transmitter; separate light sources could be used for each of the optical fibres used; for each of the two detection branches several optical fibres can be used within the main measuring path and the reference path with respect to a relative fixed lens running inside each of them. In this way displacement of the membrane 1 can be detected at several points; with this solution, it is possible to use one single light source, a specific dedicated source for each fibre or a mixed solution. The optical measurement principle can be based, for example, on one of the following methods: interferometry, using preferably a frequency modulation technique (FWCM), low-coherence interferometry using in this case a non-coherent light source such as LED, optical retroaction, etc.

In the light of the description provided, other characteristics, modifications or improvements are feasible and may be evident to a person skilled in the art. Any such characteristics, modifications and improvements shall consequently be considered part of the present invention. In practical terms, any materials and any contingent sizes and shapes of the components may be used, according to need and the state of the art.

We claim:

1. A pressure transmitter for detection of a physical variable relative to a process fluid, comprising:
    a first and a second pressure-sensitive membrane suitable for interfacing with said process fluid;
    a pressure sensor having a supporting body provided with a cavity inside which a third pressure-sensitive membrane is positioned, said third membrane having a first face and a second face operationally connected to said first and second membrane, respectively, so that the pressure exerted by the process fluid on said first and second membrane is transmitted to said third membrane causing displacement thereof with respect to a reference position;
    an analysis and conditioning unit operationally coupled to at least one light source;
    a first optical fibre having a first end operationally coupled to said at least one light source and a second end positioned at a pre-set distance from said first face;
    a second optical fibre having a third end operationally coupled to said at least one light source and a fourth end positioned at a pre-set distance from said second face, said first and second optical fibres transmitting the light signals emitted by said source to said third membrane and the signals reflected by the third membrane to said analysis and conditioning unit, and said analysis and conditioning unit generating, on the basis of the reflected signals received, signals directly or indirectly indicating said physical variable;
    a first fixed lens operationally combined with said second end of said first optical fibre, and a second fixed lens operationally combined with said fourth end of said second optical fibre; and
    a first beam splitter suitable for splitting, within said first optical fibre, the light beams coming from said source into a first path which strikes said first face of the third membrane and a second path which strikes said first fixed lens;
    wherein said first and second lens provide reflected optical reference signals that run in parallel with main measuring signals that are reflected by the first face and the second face of said third membrane, said reflected optical reference signals following separated optical paths from said main measuring signals.

2. The pressure transmitter as claimed in claim 1, wherein said first fixed lens and said second fixed lens consist of a reflecting surface of said second and fourth ends respectively.

3. The pressure transmitter as claimed in claim 1, wherein said first fixed lens and said second fixed lens consist of two corresponding reflecting surfaces positioned at a pre-set distance from said second and fourth ends respectively.

4. The pressure transmitter as claimed in claim 1, comprising a second beam splitter suitable for splitting, within said second optical fibre, the light beams coming from said source into a third path which strikes said second face of the third membrane and a second path which strikes said second fixed lens.

5. The pressure transmitter as claimed in claim 4 wherein said first beam splitter and said second beam splitter are configured so as to direct towards said analysis and conditioning unit the reflected signals coming from said first face and second face of the third membrane and from said first and second fixed lenses.

6. The pressure transmitter as claimed in claim 1, wherein said analysis and conditioning unit comprises, for each optical fibre, a first block for acquisition of the reflected signals received, a second block for measurement of the frequency and phase displacement between the signals received, a third block for combination of the signals received and a fourth block for the generation of a signal indicating the displacement of said third membrane.

7. The pressure transmitter as claimed in claim 5 wherein said analysis and conditioning unit comprises, for each optical fibre, a first block for acquisition of the reflected signals received, a second block for measurement of the frequency and phase displacement between the signals received, a third block for combination of the signals received and a fourth block for the generation of a signal indicating the displacement of said third membrane.

8. The pressure transmitter as claimed in claim 1, wherein said analysis and conditioning unit is positioned remote and outside the supporting body.

9. The pressure transmitter as claimed in claim 1, wherein said analysis and conditioning unit is positioned inside the supporting body.

10. The pressure transmitter as claimed in claim 1, wherein said cavity of the supporting body has two shaped surfaces that can geometrically couple with said first or second face respectively of said third membrane.

* * * * *